United States Patent [19]

Tucholski

[11] Patent Number: 5,026,615
[45] Date of Patent: Jun. 25, 1991

[54] ELECTROCHEMICAL CELL WITH DISCONNECT SWITCH DEVICE

[75] Inventor: Gary R. Tucholski, Parma Heights, Ohio

[73] Assignee: Eveready Battery Company, Inc., St. Louis, Mo.

[21] Appl. No.: 563,140

[22] Filed: Aug. 6, 1990

[51] Int. Cl.⁵ ............................................. H01M 2/00
[52] U.S. Cl. ....................................... 429/61; 429/58; 429/66
[58] Field of Search ................... 429/61, 66, 58, 57, 429/59, 7, 169; 320/47

[56] References Cited

U.S. PATENT DOCUMENTS

| | | | |
|---|---|---|---|
| 2,651,669 | 9/1953 | Neumann | 136/182 |
| 3,081,366 | 3/1963 | Belove | 136/6 |
| 3,177,313 | 4/1965 | Klimak | 200/83 P |
| 3,373,057 | 3/1968 | Jost | 136/6 |
| 3,617,386 | 11/1971 | Bosben | 136/107 |
| 3,676,221 | 7/1972 | Bach | 136/111 |
| 3,775,661 | 11/1973 | Frezzolini | 320/46 |
| 4,025,696 | 5/1977 | Tucholski | 429/61 |
| 4,028,478 | 6/1977 | Tucholski | 429/61 |
| 4,690,879 | 9/1987 | Hubndorff | 429/61 |
| 4,756,983 | 7/1988 | Tucholski | 429/61 |
| 4,818,641 | 4/1989 | Ledenican | 429/61 |

Primary Examiner—Anthony Skapars
Attorney, Agent, or Firm—Robert W. Welsh

[57] ABSTRACT

An electrochemical cell, such as a rechargeable cell, employing switch means comprising a spring member biased to electrically connect one of the cell's terminals to one of the cell's electrodes and wherein a pressure responsive movable member is designed to pivot the spring member on a fulcrum member to break the electrical connection between the electrode and the terminal when the pressure within the cell exceeds a predetermined level and wherein said spring member is isolated from the active components of the cell.

20 Claims, 1 Drawing Sheet

ELECTROCHEMICAL CELL WITH DISCONNECT SWITCH DEVICE

FIELD OF THE INVENTION

The invention relates to an electrochemical cell, such as a rechargeable cell, that employs a safety disconnect device isolated from the active materials of the cell and operable to break the electrical circuit of the cell when the pressure within the cell exceeds a predetermined level.

BACKGROUND OF THE INVENTION

Galvanic cells, such as alkaline cells, are generally designed to vent when the internal pressure exceeds a predetermined amount. When exposed to an abuse condition, such as being charged to an excessive degree, the cell is designed to vent and allow gas to escape. Under certain abuse conditions, electrolyte entrained in the gas may be forced from the cell. It is preferable to have the electrolyte escape rather than have the cell rupture from internal pressure buildup.

Cell manufacturers have used a number of approaches to resolve the problem of expelling electrolyte during venting. One method of preventing seal rupture due to abuse charging or the like is to insert a diode in the battery's electrical circuit. By eliminating the possibility of charging the cells, internal gas is not generated and the seal never ruptures. Another electrically related mechanism is a belleville shaped "flip switch". This device is triggered by bulging of the closed end of the cell's cylindrical container which causes the belleville member to invert and thereby break electrical contact. Another method involves the use of adsorbents or electrolyte thickeners. The adsorbent materials are usually located outside the seal area and beneath the cell's cover or jacket. As electrolyte escapes from a ruptured seal, the liquid is adsorbed. Spew thickeners are mixed with the electrolyte and therefore are contained within the cell. The objective of the thickener is to slow down and/or adsorb any leakage that may occur. The disadvantage of using either an adsorbent or a thickener is that both materials tie up space that otherwise could be used for active materials of the cell. A third procedure is to use an outer container and end covers as an electrolyte containment system to provide space to contain the electrolyte that may escape.

U.S. Pat. No. 3,676,221 discloses a battery comprising a plurality of stacked, disk-like sealed cells secured together by cups fitted over one cell and having bottoms spot-welded to the next cell and sidewalls spot-welded to the interfitting cell. A heat-shrunk sheath encloses the battery and has caps forming the poles. Between each pair of cells is a circular disc of insulating material against which the cup bottoms bulge upon expansion of the contents of the cells, thereby breaking the welds and electrically disconnecting the cells.

U.S. Pat. No. 4,025,696 describes a disk shaped washer which inverts after the bottom bulge exceeds a predetermined value. Prior to activation, the washer's inside diameter is slanted toward the container. As the container bulges, the bottom of the container pushes against the washer and eventually causes the washer to invert. This inversion electrically separates the bottom cover from the container. An open circuit is the net result.

U.S. Pat. No. 3,775,661 describes a cell in which internal pressure forces a diaphragm against a switch which electrically disconnects a charging device. The diaphragm is located inside a venting device which is attached to one end of the cell.

U.S. Pat. No. 2,651,669 describes a bulge activated switch that can be incorporated into a single cell battery or a multiple cell battery and operable such that the bulge can be used to open a switch or switches that control the cell's discharging and/or charging circuits.

U.S. Pat. No. 3,617,386 describes a cell in which a thin sheet of metal with "spring back" ability is positioned between the seal and cover of the cell so as to break the cell's electrical circuit when the bulge becomes excessive.

U.S. Pat. No. 3,081,366 describes a sealed cell having a metallic sheet member connected to one cell electrode and its periphery insulating affixed to an open casing end and an overlying exposed metallic terminal insulating held over the sheet member. A movable switch portion normally connects an intermediate pressure-deflectable sheet member portion to the external terminal and, in response to outward motion of the deflected sheet portion under excess internal pressure the switch portion disconnects the external terminal from the deflected sheet portion.

U.S. Pat. No. 3,373,057 describes a cell in which the cover of the casing of the cell is provided centrally with an inwardly concave-contact button. A dished (which is to say concave convex) snap-acting spring disc of the automatic reset type is marginally sealed to the inside of the cover. An automatic reset disc after snapping in one direction in response to pressure on its convex side will return with snap action when the pressure is relieved. The disc is provided centrally with a sealed movable contact for engagement and disengagement with an internal fixed contact when the disc snaps to and from. The arrangement is such that when the contacts are engaged the disc is slightly sprung toward the cover but short of causing snap action. This maintains good electrical contact pressure under safe internal gas pressures. The fixed contact is electrically connected with one set of battery plates and the other set of plates is electrically connected with the casing.

U.S. Pat. No. 4,690,879 describes a cylindrical galvanic cell employing a unitary type cover welded to the container as a failsafe circuit interruption means for electrically isolating one terminal of the cell from the cell's electrochemical system when the bottom of the cylindrical cell bulges beyond a predetermined amount so that the unitary cover breaks electrical contact with the housing of the cell.

U.S. Pat. No. 4,756,983 describes a cylindrical galvanic cell employing a cover having a peripheral flange electrically contacting the conductive container of the cell and whereby a predetermined bulge in the bottom of the container will cause the central portion of the cover to separate from the peripheral flange portion thereby electrically isolating the central portion of the cover from the cell.

U.S. Pat. No. 3,177,313 discloses a pressure operated snap action switch having a member with an arched central portion which is deformed by a pressure stress and returned to its original position when the stress is removed.

Not only alkaline cells but rechargeable cells, such as nickel-cadmium cells, metal hydride cells and the like, can produce internal pressure buildup when the cell is overcharged or charged at a rate other than its designed charging rate. If a rechargeable cell is charged at an excessive rate or overcharged, pressure could increase within the cell until actual disassembly of the cell occurs. In some cell circuit interrupter devices, the device is located within the cell in proximity to or contacting the cell's active materials. Thus caustic ingredients of the cell could contact the cell circuit interrupter device and contaminate the device and prevent it from properly functioning.

It is an object of the present invention to provide a novel means for electrically isolating one terminal of a cell from the cell's electrical circuit when the internal pressure of the cell exceeds a predetermined level.

It is another object of the present invention to provide a rechargeable cell with novel means for electrically isolating one terminal of the cell from the cell's electrical circuit when the internal pressure of the cell exceeds a predetermined level so that during charging of the cell if the internal pressure exceeds a predetermined level, the electrical circuit of the cell will be broken.

It is another object of the present invention to provide novel switch means isolated from the active materials of the cell that will break the cell's electrical circuit when the internal pressure exceeds a predetermined level and connects the circuit when the internal pressure decreases below the predetermined level.

It is another object of the present invention to provide a cell with a snap action circuit interrupter that responds to pressure within the cell that is easy to make, cost effective and easy to assemble.

SUMMARY OF THE INVENTION

The invention relates to an electrochemical cell comprising an electrode assembly containing a first electrode of one polarity and a second electrode of an opposite polarity; a housing containing the electrode assembly; a first terminal electrically connected to the first electrode and a second terminal electrically insulated from the first terminal; switch means within the housing comprising a spring member biased to electrically contact the second terminal and positioned adjacent to a nonconductive fulcrum member secured to the housing and said fulcrum member having a segment disposed and positioned with respect to the spring member so that said spring member can pivot on said segment when said spring member is exposed to an internal applied force, and a moveable conductive member which electrically connects the second electrode to said spring member and when the internal pressure in the cell exceeds a first predetermined level the moveable conductive member moves to exert force against the spring member which then pivots on the segment of the nonconductive fulcrum member and breaks the electrical connection between the spring member and the second terminal.

Preferably, the switch means should be resettable so that once the internal pressure decreases below a second predetermined value, the moveable member will be forced back to its original position by the spring member and the spring member will once more be electrically connected to the second terminal. Thus the spring member should preferably be biased so that in the normal state or steady state embodiment, the spring member will electrically connect an electrode of the cell to the appropriate terminal on the cell. The moveable member has to be positioned in the cell to react to any pressure buildup within the cell so that if the pressure buildup exceeds a predetermined amount, the moveable member will cause the spring to deflect or pivot on a selected area of the fulcrum member whereby the switch member will break the electrical contact between the terminal and the electrode in the cell. As long as the pressure buildup is maintained in the cell, the electrical circuit will be broken. Preferably, when the internal pressure is decreased below a second predetermined level, the spring member will revert back to assume its normal or original position and force the moveable member back into its original position. Although it is preferable to have the switch member resettable, in some applications the switch member could be adjusted so that once it is deflected, it will not return to its initial position so that the electrical circuit of the cell remains broken. A preferred embodiment would employ a belleville type spring which in the normal position would electrically connect an electrode of the cell to its appropriate terminal. The belleville spring would be positioned adjacent an insulator member that acts as a fulcrum for the spring member. Thus when the spring member is pushed or acted upon, it will deflect or pivot on the fulcrum member and break the electrical contact between an electrode of the cell and its appropriate terminal. Preferably, when the force acting on the spring member is reduced, the spring member will deflect on the fulcrum and revert back to its initial or original position where it will once again electrically connect an electrode of the cell to its appropriate terminal.

Preferably, the switch means could be assembled within the cell so that it is isolated from the active components of the cell and thus insulated from any corrosive elements of the electrochemical cell system such as any caustic ingredients that may be present in the cell. This isolation of the switch means could be accomplished by positioning the switch means proximate one end of the housing, preferably the cover for the housing, and then have a separate member disposed between the active components of the cell and the spring member. This member could comprise the pusher member which could be positioned between the active components of the cell and the spring member.

Preferably in alkaline cells, the first terminal would be electrically connected to the positive electrode and the second terminal would generally be electrically connected to the negative electrode. In nickel cadmium cells, the first terminal would be electrically connected to the positive electrode and the second terminal would be electrically connected to the negative electrode. The switch means should preferably be positioned proximate the cover for the housing so that it would be isolated from the active components of the cell.

The switch means of this invention is ideally suited for rechargeable cells such as nickel cadmium cells, metal hydrides cells, lithium-$MnO_2$ cells and the like. As stated above, when charging a cell employing the switch means of this invention, if the internal pressure of the cell exceeds a predetermined level, the electrical circuit will be broken so that the charge will be stopped until the internal pressure decreases to below a predetermined level. This will prevent the cell from receiving a flow of electrical current when the pressure within the cell is above a predetermined value. Generally, for most rechargeable cells, the spring means should respond to internal pressure when it exceeds 30 psi, and preferably 50 psi.

The switch means of this invention is also suitable for other cell systems such as alkaline cells employing an $MnO_2$ positive electrode, a zinc negative electrode and an electrolyte solution comprising potassium hydroxide. For this cell, the predetermined pressure has to be below the crimp release pressure for the cell.

The present invention will become more apparent from the following description thereafter considered together with the accompanying drawings which are set forth as being exemplary of the present invention and is not intended to be limitative thereafter in any respect.

BRIEF DESCRIPTION OF THE DRAWINGS

Referring to FIG. 1 a part of a cell 2 is shown which comprises a container 4 housing the electrode assembly 5 and closed at the opening by a conductive cover 6 that is electrically insulated from the container 4. Cover 6 is secured over container 4 using a nonconductive gasket 8 and then sealing the cell using conventional closing techniques. In addition to cover 6, a conductive diaphragm 10, such as a metallic diaphragm, and an insulator washer 12 are clamped between the folded over ends of gasket 8. At the center of diaphragm 10 is a projected segment 14 which is used to accommodate opening 16 of conductor pusher member 18. Conductive member 18 comprises a cylindrical base 20 with a vertical projected central portion 22. A conductive belleville spring 24 is positioned over central portion 22 of member 18 and extended to contact cover 6. Disposed above belleville spring 24 and secured to the undersurface of cover 6 is an insulator fulcrum member 26 which acts as a fulcrum for spring 24. Although not shown, the conductive diaphragm 10 can be electrically connected to an electrode within the cell using conventional means such as conductive tabs, wires or the like. In some cell constructions, such as the coiled rolled electrode assembly 5 shown in FIG. 1, an electrode 9 could be in direct contact with conductive diaphragm 10, preferably, direct contact is made at the periphery of the conductive diaphragm. The connection of the opposite polarity electrode of the electrode assembly 5 with the container 2 could be made using conventional means such as conductive tabs, wires or the like to adapt the container as a terminal for the cell. As shown, this opposite polarity electrode 13 makes direct contact with the container 2 without any need for an additional component.

Referring to FIG. 1, the conductive diaphragm 10 which is electrically connected to electrode 9 in the cell is also electrically connected to pusher member 18 which is electrically connected to conductive spring 24 which in turn is electrically connected to conductive cover 6 thereby adapting cover 6 as a terminal for electrode 9 of the cell. Under normal pressure conditions within the cell, the electrical circuit of the cell would be complete and the cell could deliver or receive a current flow. However, if the pressure within the cell exceeds a predetermined value, it will exert force against diaphragm 10 which in turn will axially move member 18 upward against spring 24. If a predetermined internal pressure is exceeded, belleville spring 24 will deflect about fulcrum insulator member 26 as shown in FIG. 2. This will cause the end of belleville spring 24 to deflect downward thereby breaking electrical contact with conductive cover 6. Thus when using this embodiment of the invention, the electrical circuit of the cell will be broken when the internal pressure within the cell exceeds a predetermined value. Once the internal pressure decreases, the belleville spring 24 could be made to snap back to its original position and once again make electrical contact with cover 6. As shown in FIGS. 1 and 2, conductive diaphragm 10 isolates pusher member 18, belleville spring 24 and fulcrum insulator 24 from the active components of the cell which are housed below diaphragm 10 in container 2.

FIG. 3 shows another embodiment of the invention in which a cell cover 30 is secured at the open end of cell container 32 by a seal member 34. Seal member 34 is a nonconducting member having an opening at its center 36 for accommodating a pusher pin member 38. Preferably, pusher pin member 38 is secured to the under surface segment 40 of seal member 34 using a conventional sealant such as polyamide or asphalt. Attached to the bottom of pusher pin member 38 is a conductive tab 42 which is used to make electrical contact with one of the electrodes 43 of the cell. As stated above in reference to FIGS. 1 and 2, the opposite polarity electrode of the cell could be electrically connected to container 32 using conventional conductive means such as tabs, wires or the like, or the opposite polarity electrode could make direct contact with the container 32. As shown in FIG. 3, pusher pin member 38 projects through cover 30 at the center. Bushing 44 could be a conductive or non-conductive member. Bushing 44 may be made from a conductive material in order to provide for a low resistance contact with cover 30 at interface 33. If bushing 44 is conductive, then clearance is needed between bushing wall 45 and the interior wall that defines the central opening in cover 30. This clearance is required in order to insure free movement of bushing 44 through the central opening in cover 30 and to prevent undesirable electrical flow between the bushing 44 and the cover 30. Pusher pin member 38 has a ridge 46 onto which is positioned a conductive belleville spring 48. Thus the inner segment of conductive belleville spring 48 rests on ridge 46 of pusher pin member 38 and is secured in place by the lower end face of bushing 44. In the normal position, belleville spring 48 extends to electrically contact cover 30. Disposed between spring 48 and the underside of cover 30 at the inner portion of spring 48 is a nonconductive member 50 which acts as an insulating fulcrum for spring 48. Secured to cover 30 is a hat-shaped conductive terminal 52.

Referring to FIG. 3, an electrical path from electrode 43 within the cell is made through conductive tab 42, conductive pin member 38, conductive spring 48, conductive cover 30 and conductive terminal 52. Thus in the assembly shown in FIG. 3, an electrical circuit is made from electrode 43 in the cell to the outer terminal 52 on cover 30 thereby permitting current to flow into or out of the cell. Seal 34 is shown with an inverted "V" shape disturbance 54 which could also be formed into a "V" shape disturbance if desired. This disturbance 54 functions as a hinge which minimizes axial movement of the seal's central segment during the cell closing operation. The embodiment of FIG. 3 is made so that when the internal pressure within the cell exceeds a predetermined level, it will force pin member 38 axially upward while seal 34 deflects upward about its hinge 54 as shown in FIG. 4. The upward axial movement of pin member 38 in response to internal pressure will deflect spring 48 about insulating fulcrum 50 so that the outer edge of spring 48 deflects away and breaks contact with cover 30. A recess 56 is deposed at the undersurface of cover 30 at its central area to accommodate the deflection of the inner portion of conductive spring 48. This effectively breaks the electrical contact of the electrode 43 to terminal 52 of the cell and prevents the flow of current into and out from the cell. As shown in FIGS. 3 and 4, seal 34 and pin member 38 effectively isolates the spring 48 and insulating fulcrum 50 from the active components of the cell which are housed below the seal 34 in container 32.

Figure 1:
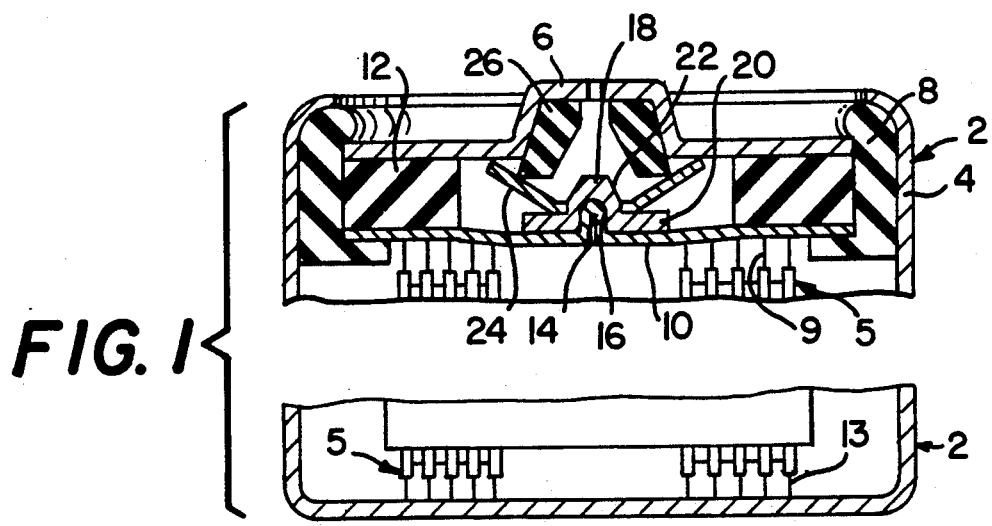
FIG. 1 is a cross-sectional elevational view of part of a cell showing the switch means of this invention in the first position.
Figure 2:
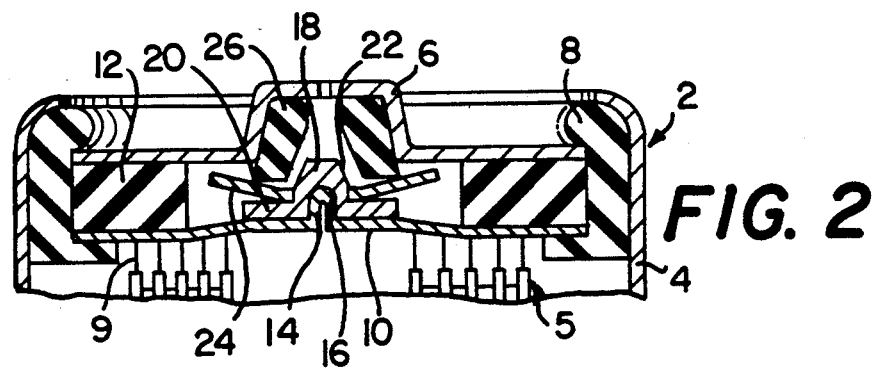
FIG. 2 is a cross-sectional elevational view of the cell of FIG. 1 showing the switch means of this invention in the second position.
Figure 3:
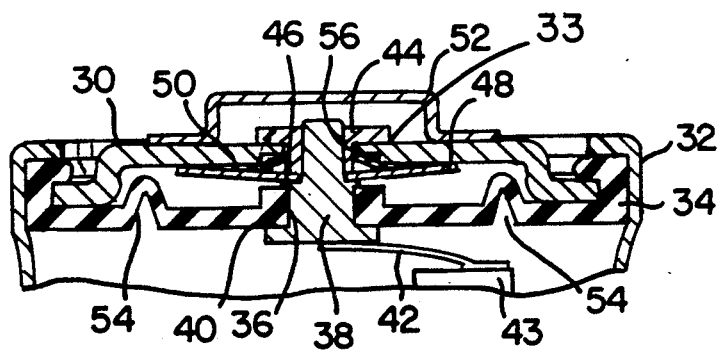
FIG. 3 is a cross-sectional elevational view of part of a cell showing another embodiment of the switch means of this invention in the first position.
Figure 4:
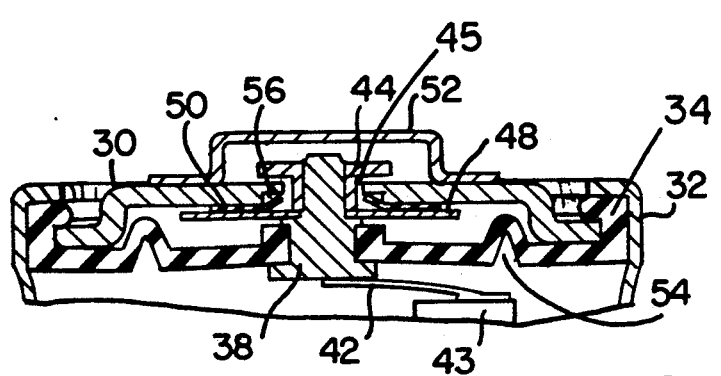
FIG. 4 is a cross-sectional elevational view of the cell of FIG. 3 showing the switch means of this invention in the second position.

Although the present invention has been described with reference to particular details, it is not intended that these details shall be construed as limiting the scope of the invention. For example, the first predetermined level of internal pressure required to break contact in the switch could be equal to the second predetermined level of pressure required to reconnect the electrical connection within the switch.

What is claimed:

1. An electrochemical cell comprising an electrode assembly containing a first electrode of one polarity and a second electrode of an opposite polarity; a housing containing the electrode assembly; a first terminal electrically connected to the first electrode and a second terminal electrically insulated from the first terminal; switch means within the housing comprising a spring member biased to electrically contact the second terminal and positioned adjacent to a nonconductive fulcrum member secured to the housing and having a segment disposed and positioned with respect to the spring member so that said spring member can pivot on said segment when said spring member is exposed to an internal applied force, and a moveable conductive member which electrically connects the second electrode to said spring member, and wherein when the internal pressure in the cell exceeds a predetermined level the moveable conductive member exerts a force against the spring member to pivot the spring member on the segment of the nonconductive fulcrum member and thereby break the electrical connection between the spring member and the second terminal.

2. The electrochemical cell of claim 1 wherein the spring member retains the break in the electrical connection to the second terminal after the internal pressure exceeds a first predetermined level and then decreases below a second predetermined level.

3. The electrochemical cell of claim 1 wherein the spring member retains the break in the electrical connection to the second terminal after the internal pressure exceeds a first predetermined level and then makes the electrical connection to the second terminal when the internal pressure decreases below a second predetermined level.

4. The electrochemical cell of claim 1 wherein the spring member is physically isolated from the electrode assembly in the container by a member placed between the spring member and the electrode assembly.

5. The electrochemical cell of claim 1 wherein the housing comprises a container having an open end closed by a cover and wherein said switch means is positioned proximate said cover.

6. The electrochemical cell of claim 5 wherein said spring member directly contacts the cover of the cell and said cover is a conductive cover and is the second terminal of the cell.

7. The electrochemical cell of claim 6 wherein the nonconductive fulcrum member is disposed between said spring member and said cover and positioned so that the spring member will pivot on the segment of said nonconductive fulcrum when the moveable member moves in response to the internal pressure exceeding a predetermined level.

8. The electrochemical cell of claim 5 wherein the container is a cylindrical container and said moveable member moves axially within the container when the internal pressure exceeds the predetermined level.

9. The electrochemical cell of claim 1 wherein the electrode assembly is a metal hydride electrode assembly.

10. The electrochemical cell of claim 1 wherein the predetermined pressure level is about 30 psi and above.

11. The electrochemical cell of claim 1 wherein the electrode assembly is a nickel cadmium electrode assembly.

12. The electrochemical cell of claim 1 wherein the electrode assembly is an alkaline electrode assembly.

13. The electrochemical cell of claim 1 wherein the first electrode is the positive electrode.

14. The electrochemical cell of claim 1 wherein the second electrode is the positive electrode.

15. The electrochemical cell of claim 5 wherein the electrode assembly is a metal hydride electrode assembly.

16. The electrochemical cell of claim 5 wherein the electrode assembly is a nickel cadmium electrode assembly.

17. The electrochemical cell of claim 5 wherein the electrode assembly is an alkaline electrode assembly.

18. The electrochemical cell of claim 15 wherein the housing comprises a conductive container having an open end closed by a conductive cover which is electrically insulated from the container, said conductive container is the first terminal and said conductive cover is the second terminal of the cell.

19. The electrochemical cell of claim 16 wherein the housing comprises a conductive container having an open end closed by a conductive cover which is electrically insulated from the container, said conductive container is the first terminal and said conductive cover is the second terminal.

20. The electrochemical cell of claim 17 wherein the housing comprises a conductive container having an open end closed by a conductive cover which is electrically insulated from the container, said conductive container is the first terminal and said conductive cover is the second terminal.

* * * * *